United States Patent [19]
Edney et al.

[11] Patent Number: 5,720,558
[45] Date of Patent: Feb. 24, 1998

[54] TILTING BEARING PAD WITH AN AXIAL FEED GROOVE HAVING AN EXIT SIDE PROFILED AREA

[75] Inventors: Stephen L. Edney; Nyhl M. Austin; George E. Hedrick, all of Wellsville, N.Y.

[73] Assignee: Dresser-Rand Company, Corning, N.Y.

[21] Appl. No.: 662,475

[22] Filed: Jun. 13, 1996

Related U.S. Application Data

[60] Provisional application No. 60/005,305, Oct. 16, 1995.
[51] Int. Cl.⁶ ................................................ F16C 17/03
[52] U.S. Cl. ........................................ 384/309; 384/117
[58] Field of Search ................................. 384/117, 309, 384/311, 312

[56] References Cited

U.S. PATENT DOCUMENTS

| | | | |
|---|---|---|---|
| 3,022,123 | 2/1962 | Gruber | 384/311 |
| 3,172,709 | 3/1965 | Baudry | 384/311 X |
| 3,671,137 | 6/1972 | Ball | 384/99 X |
| 3,722,965 | 3/1973 | Gemein et al. | 384/114 |
| 4,514,099 | 4/1985 | John et al. | 384/100 |
| 4,568,204 | 2/1986 | Chambers | 384/309 X |
| 4,772,137 | 9/1988 | Salter, Jr. et al. | 384/120 |
| 4,815,865 | 3/1989 | Gerling | 384/309 X |
| 4,902,144 | 2/1990 | Thoren | 384/398 |
| 4,944,609 | 7/1990 | Salter, Jr. et al. | 384/118 |
| 5,000,584 | 3/1991 | Simmons | 384/118 |
| 5,169,242 | 12/1992 | Blase et al. | 384/99 |
| 5,360,273 | 11/1994 | Buckmann | 384/99 |

*Primary Examiner*—Thomas R. Hannon
*Attorney, Agent, or Firm*—Nixon, Hargrave, Devans & Doyle

[57] ABSTRACT

A tilting bearing pad for use in a turbine engine in accordance with the present invention includes an opening extending between opposing inner and outer surfaces of the pad and a profiled area extending from the opening. More specifically, the opening comprises a feed hole which extends from the outer surface toward the inner surface of the pad and is connected to an axial feed groove which extends to and along the inner surface. The profiled area extends from one side of the axial feed groove towards the trailing edge of the bearing pad along the inner surface. The side of the profiled area facing the trailing edge of the pad may be squared or tapered. The side of the axial feed groove facing the leading edge remains substantially flush with the groove and does not extend towards the leading edge. A turbine engine with the tilting bearing pad as described above also includes two bearing cases, a rotor, and a fluid supply system. The bearing cases are located at opposing ends of the turbine case. Each bearing case comprises a housing ring with first and second end plates connected to opposing ends of the housing ring. The rotor extends through the end plates, the housing rings, and the bearing cases and rotates about a first axis in the turbine case. The fluid supply system supplies the fluid which forms the fluid film between the tilting bearing pads and the rotor and is connected by an oil supply groove in the housing to an annulus. The annulus is connected to each of the feed holes in the bearing pads by feed tubes.

12 Claims, 8 Drawing Sheets

TILTING BEARING PAD WITH AN AXIAL FEED GROOVE HAVING AN EXIT SIDE PROFILED AREA

FIELD OF THE INVENTION

This application claims the benefit of U.S. Provisional Application No. 60/005,305 filed Oct. 16, 1995. This invention relates generally to a bearing pad for a turbine engine and, more particularly, to a tilting bearing pad with an axial feed groove having an exit side profiled area.

BACKGROUND OF THE INVENTION

A turbine engine includes a rotor that extends along and rotates about a first axis in a turbine case. The rotor is supported by and rotates within two bearing cases, one located at each end of the turbine case. Within the bearing case, the rotor is supported by a fluid film held in place by tilting bearing pads or fixed sleeves. In turbo machinery, tilting bearing pads are preferred over fixed sleeves because of their inherent stability characteristics in suppressing self-excited vibrations.

Figure 1A:
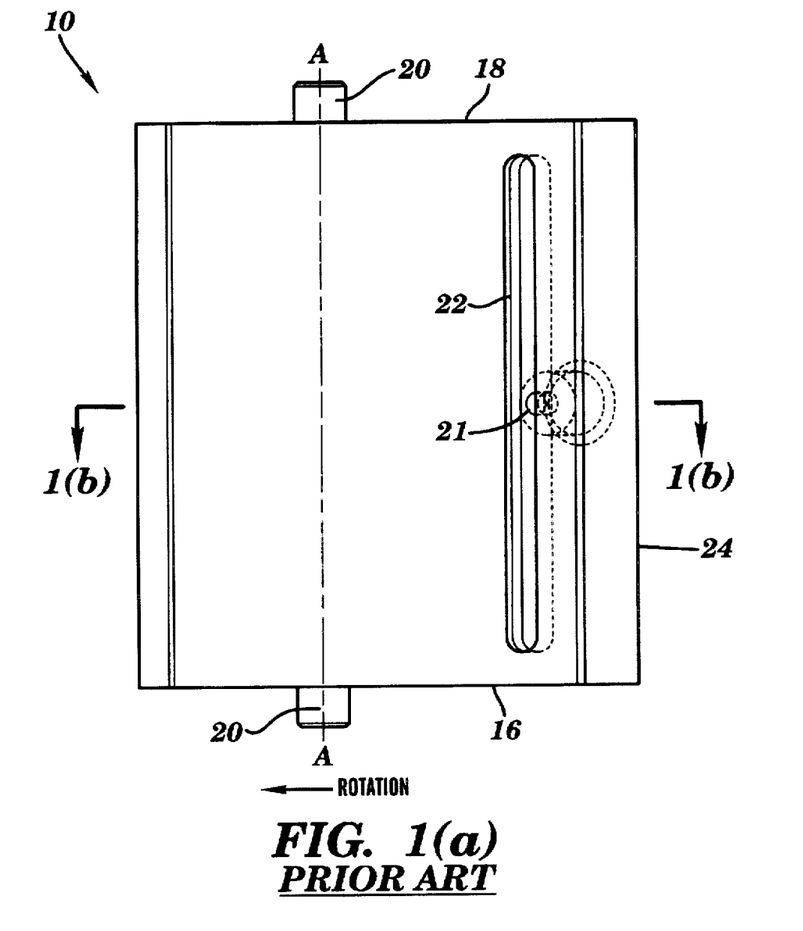
FIG. 1(a) is a top perspective view of a prior art tilting bearing pad.
Figure 1B:
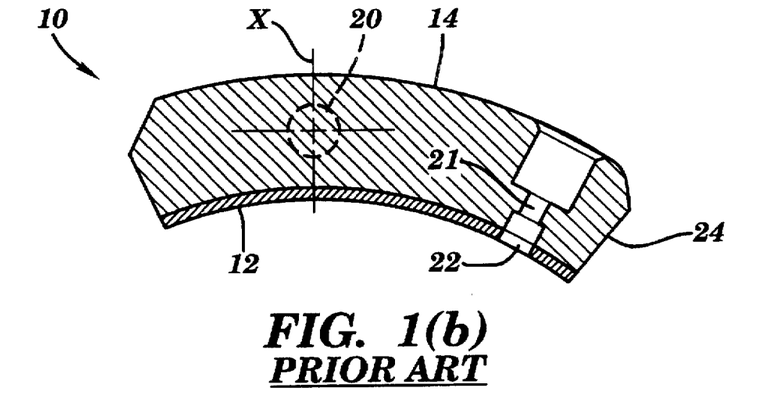
FIG. 1(b) is a cross-sectional view of the prior art tilting bearing pad taken along lines 1b—1b in FIG. 1(a)

One example of a prior art tilting bearing pad 10 is illustrated in FIGS. 1(a–b). The bearing pad 10 has an arc-shape with opposing inner and outer surfaces 12 and 14 and opposing side surfaces 16 and 18. A retaining pin 20 is secured to each of the side surfaces 16 and 18. When the tilting bearing pad 10 is installed in the turbine engine in a bearing housing, the bearing pad pivots about a pivot point X located adjacent to the upper surface 14 of the bearing pad 10. A feed hole 21 extends from the outer surface 14 towards the inner surface 12 of the pad 10 near a leading edge 24 of the pad 10 and connects to a feed groove 22 which extends along the inner surface 12. The feed hole 21 and axial feed groove 22 provide a passage for oil to be supplied directly to the bearing to generate a fluid film.

Although the prior art tilting bearing pad 10 described above works, it has exhibited vibration problems for bearing loads of 20 psig or less. More specifically, the stability and damping characteristics of the statically loaded pads 10 (pads in the lower half of a bearing) derived from the oil film are not optimized. Furthermore, to increase stability, the pressure at which oil is supplied to the pad 10 must be increased to ranges which are not practical for some applications. Even further, the statically unloaded pads 10 (pads in the upper half of the bearing) may be prone to flutter.

SUMMARY OF THE INVENTION

A tilting bearing pad for use in a turbine engine in accordance with the present invention includes an opening extending between opposing inner and outer surfaces of the pad and a profiled area extending from the opening. More specifically, the opening comprises a feed hole which extends from the outer surface toward the inner surface of the pad and is connected to an axial feed groove which extends to and along the inner surface. The profiled area extends from one side of the axial feed groove towards the trailing edge of the bearing pad along the inner surface. The side of the profiled area facing the trailing edge of the pad may be squared or tapered. The side of the axial feed groove facing the leading edge remains substantially flush with the groove and does not extend towards the leading edge. A turbine engine with the tilting bearing pad as described above also includes two bearing cases, a rotor, and a fluid supply system. The bearing cases are located at opposing ends of the turbine case. Each bearing case comprises a housing ring with first and second end plates connected to opposing ends of the housing ring. The rotor extends through the end plates, the housing rings, and the bearing cases and rotates about a first axis in the turbine case. The fluid supply system supplies the fluid which forms the fluid film between the tilting bearing pads and the rotor and is connected by an oil supply groove in the bearing case to an annulus. The annulus is connected to each of the feed holes in the bearing pads by feed tubes.

A tilting bearing pad in accordance with the present invention has a number of advantages. Foremost, the damping and stability characteristics of the statically loaded pads (the pads in the lower half of the bearing) are optimized. This is because with the inclusion of the profiled area, the tilting bearing pad is able to generate additional force at the pad leading edge which increases the pad attitude angle and ensures a converging oil film wedge over the entire pad. Additionally, with the profiled area, the pressure at which the oil needs to be supplied to the tilting bearing pad can be reduced without detrimentally effecting the stability of the bearing. A secondary benefit is that the statically unloaded pads (the pads in the upper half of the bearing) are less prone to flutter which reduces fatigue of the material on the inner surface of the pads.

DETAILED DESCRIPTION OF THE INVENTION

A tilting bearing pad 26 for a turbine engine 28 in accordance with the present invention is illustrated in FIGS. 5(a–e). The tilting bearing pad 26 includes a feed hole 33, an axial feed groove 34, and a profiled area 68 which extends towards a trailing edge 36 of pad 26 from the axial feed groove 34 along an inner surface 38 of pad 26. The tilting bearing pad 26 with the profiled area 68 provides a number of advantages including providing greater bearing stability, improving bearing damping characteristics, and reducing the pressure and flowrate at which the oil needs to be supplied to pad 26.

Figure 2:
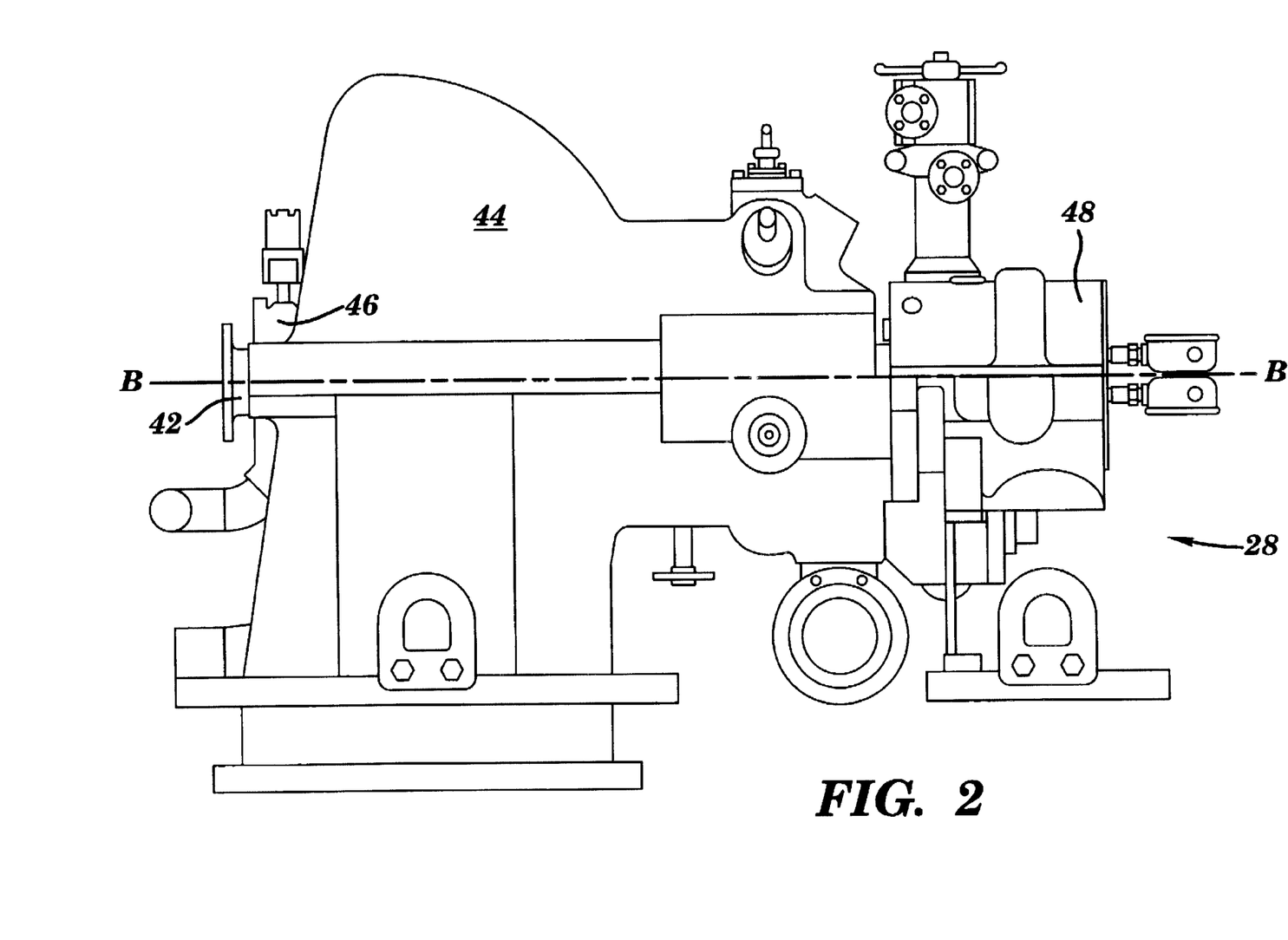
FIG. 2 is a perspective view of a turbine engine with a turbine case, two bearing cases, and a rotor.

Referring to FIG. 2, turbine engine 28 includes a rotor 42, a turbine case 44, and a pair of bearing cases 46 and 48. Typically, the turbine case 44 and the bearing cases 46 and 48 are formed in halves which are then put together as is well known to those skilled in the art. The rotor 42 extends along and rotates about a central axis B—B within the turbine case 44. The rotor 42 is supported by and rotates on a fluid film in the exhaust end and steam end bearing cases 46 and 48.

Figure 3:
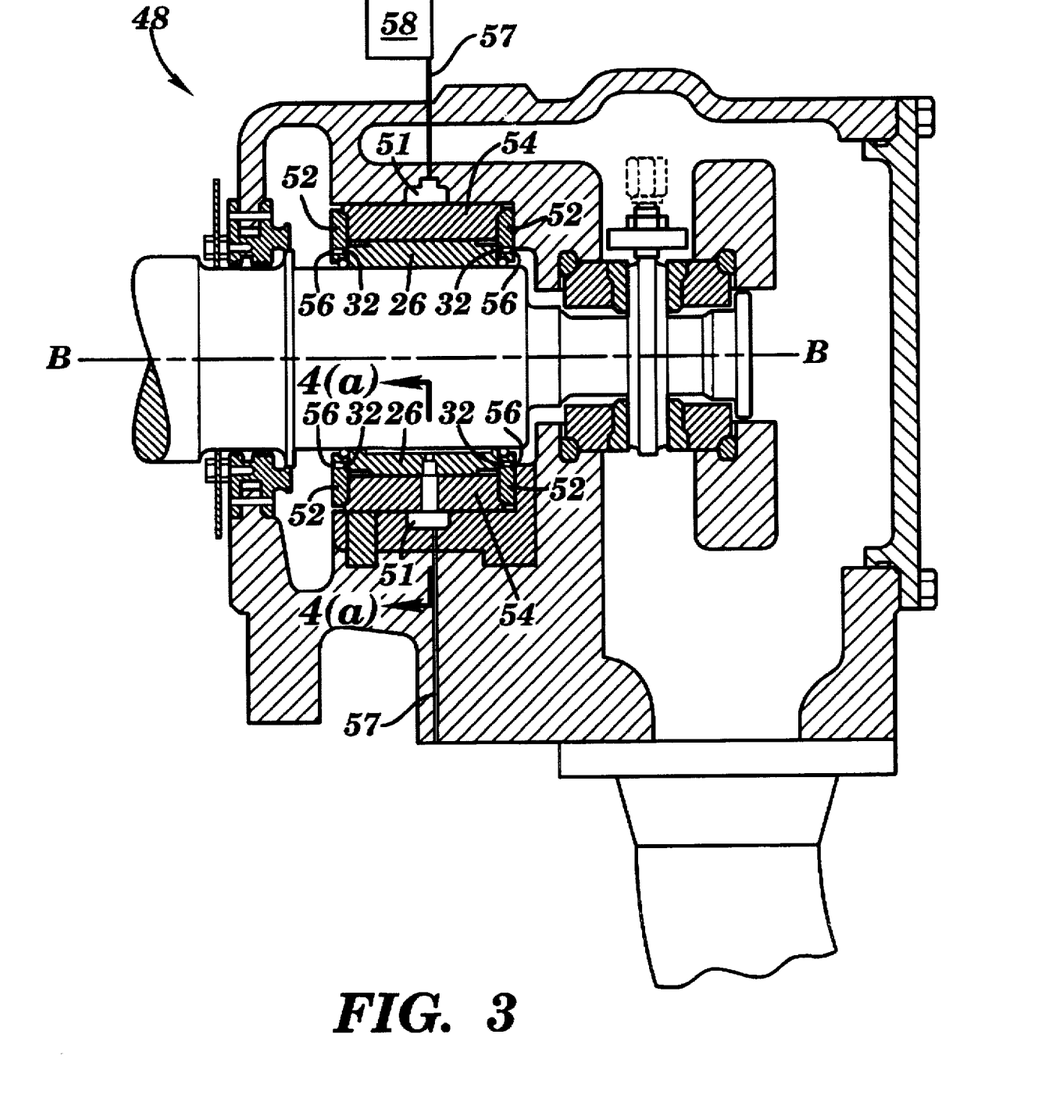
FIG. 3 is an enlarged and cross-sectional view of the steam end bearing case.

Referring to FIG. 3, an enlarged and cross-sectional view of the steam end bearing case 48 is illustrated. The tilting bearing pad 26 is connected and functions in the same way in exhaust end bearing case 46 as in steam end bearing case 48 and thus exhaust end bearing case 46 will not be described here. Steam end bearing case 48 includes a housing ring 54 and a pair of opposed end plates 52. The end plates 52 are each secured to the housing ring 54 by bolts or other securing devices, such as screws. The rotor 42 extends through end plates 52 and housing rings 54 along axis B—B. Each tilting bearing pad 26 is positioned inside the housing ring 54 between the rotor 42 and the housing ring 54. Opposing openings 56 are located in each end plate 52 to receive one of the retaining pins 32 for pad 26. The retaining pins 32 hold the tilting bearing pads 26 in place against rotation in a circumferential direction around the rotor 42 and also hold the tilting bearing pads 26 in place when the rotor 42 is removed.

Figure 4A:
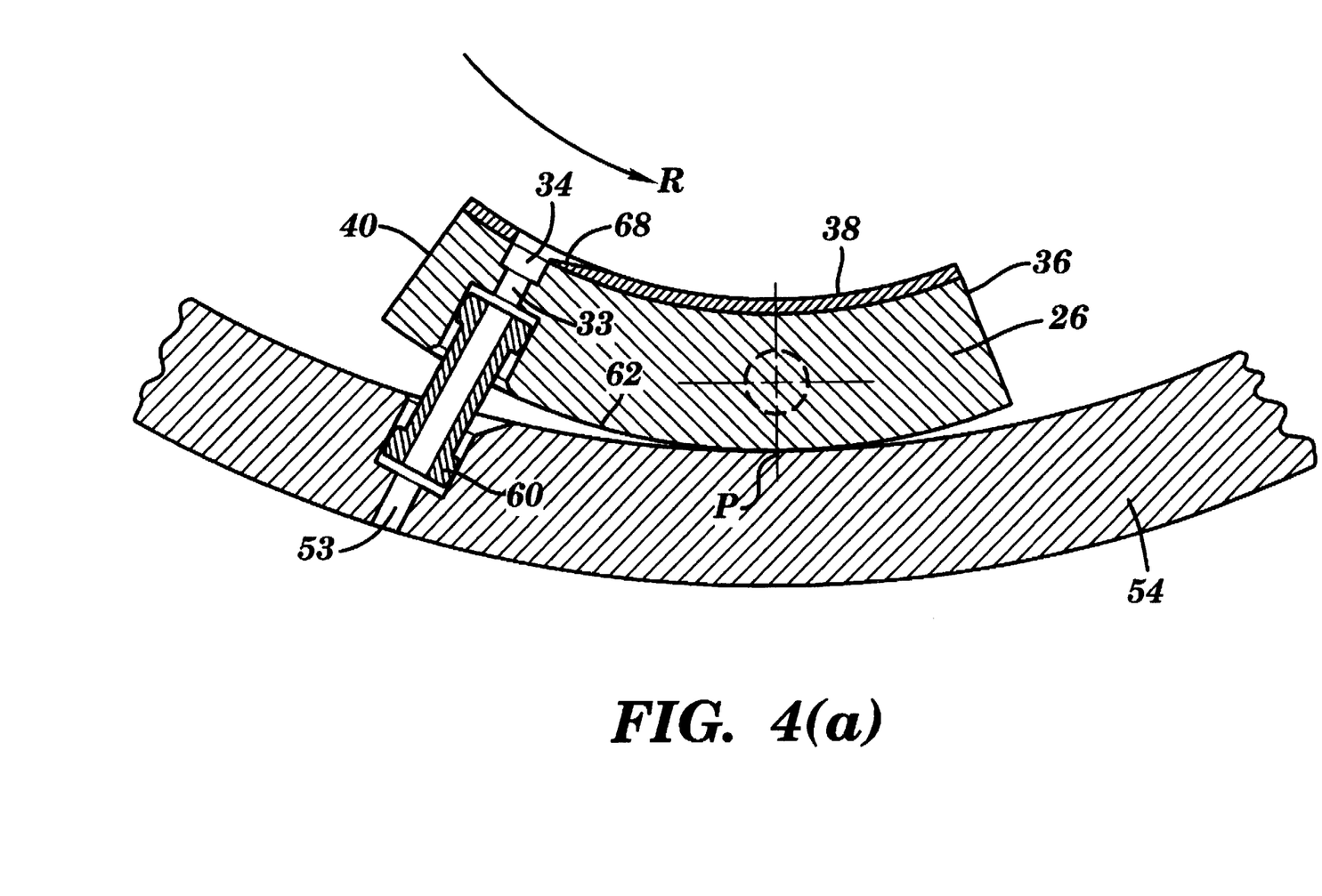
FIG. 4(a) is a partial, broken away, cross-sectional view taken along line 4a—4a in FIG. 3 illustrating the steam end bearing.

Referring to FIGS. 3 and 4(a), a fluid supply system 58 is connected to an annulus 51 by an oil supply groove 57 in bearing case 48. A feed tube 60 connects the annulus to the feed hole 33 in each tilting bearing pad 26. As shown in FIG. 4(a), both the annulus 51 and the feed hole 33 have a large diameter portion connected to a smaller diameter portion. The larger diameter portions of the annulus 51 and feed hole 33 receive opposing ends of the feed tube 60 and may include O-ring seals (not shown) to prevent any fluid from escaping. The feed hole 33 is connected to the feed groove 34. The fluid supply system 58 supplies the fluid to the tilting bearing pad 26 which forms the fluid film between the pads 26 and rotor 42. In this particular embodiment, the fluid in the fluid supply system 58 is oil, although other types of fluid could be used if desired. Additionally, in this particular embodiment the fluid supply system 58 is located outside of the bearing case 48, although it could be moved inside bearing case 48.

One of the advantages of the tilting bearing pad 26 is that the pressure and consequently the flowrate at which the fluid needs to be supplied to the pad 26 are reduced. Reducing the pressure and flowrate at which the fluid needs to be supplied helps to reduce both the size and cost of the fluid supply system 58 needed. With prior tilting bearing pads 10, such as the one disclosed in FIGS. 1(a–b), the fluid supply system 58 would have to supply fluid at higher pressures typically between 12 and 15 psig to stabilize the bearing at bearing loads of 20 psi or less. In this particular embodiment, the fluid is supplied at a pressure typically about 7.5 psig without detrimentally effecting the stability of the bearing and at a reduced cost because a smaller fluid supply system 58 can be used.

Referring to FIG. 4(a), a partial, broken away, cross-sectional view of the steam end bearing 48 taken along line 4a—4a in FIG. 3 is illustrated. The rotor (not shown in this view) would be seated in the center above the tilting bearing pad 26 shown and rotates in the direction indicated by the arrow R. The tilting bearing pad 26 is located inside the housing ring 54 and has a pivot point P about which the pad 26 pivots. The pivot point P is along the outer surface 62 of the pad 26. Typically, a bearing will have five tilting bearing pads 26, although a bearing could have as few as two tilting bearing pads 26 or any number greater than two as needed.

Referring to FIGS. 5(a–e), enlarged views of a tilting bearing pad 26 in accordance with the present invention are illustrated. As shown in FIG. 5(a), tilting bearing pad 26 includes leading edge 40, trailing edge 36, and opposing side surfaces 64 and 66. Retaining pins 32 are connected to each of the opposing side surfaces 64 and 66 and extend along a first axis C—C. As shown in FIG. 5(b), tilting bearing pad 26 has an arc-shape and opposing outer and inner surfaces 62 and 38. In this particular embodiment, pad 26 is about ¾" thick and the inner surface 38 is lined with a material, typically a babbitt material which is about $60/1000$" thick, although the dimensions of the pad and material can vary as needed. In this particular embodiment, the tilting journal bearing pads 26 operate at bearing loads less than 20 psi, although the pads 26 could operate at considerably higher loads.

Figure 5A:
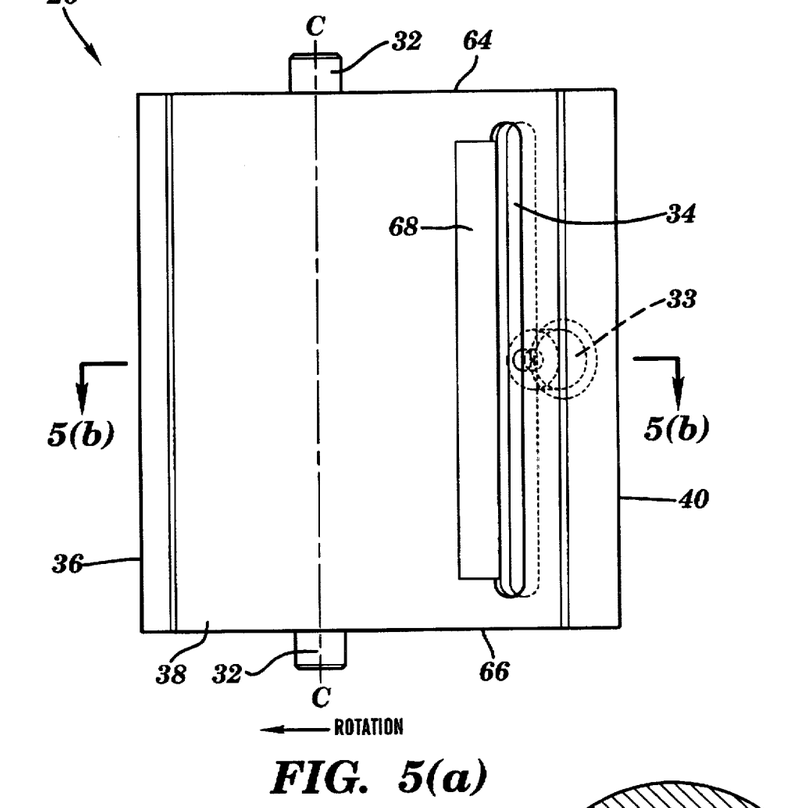
FIG. 5(a) is a top view of a tilting bearing pad in accordance with the present invention.
Figure 5B:
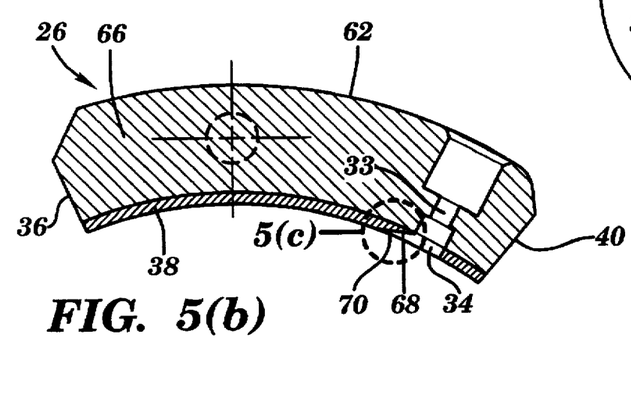
FIG. 5(b) is a cross-sectional view of the tilting bearing pad taken along line 5b—5b in FIG. 5(a)
Figure 5C:
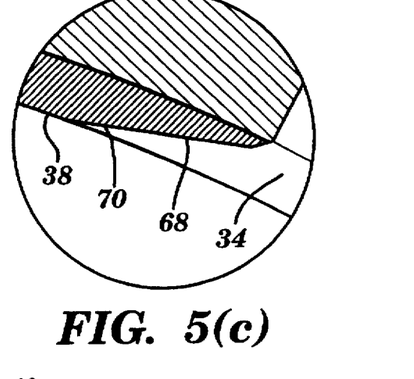
FIG. 5(c) is an enlarged view of the profiled area of the tilting bearing pad shown in FIG. 5(b)
Figure 5D:
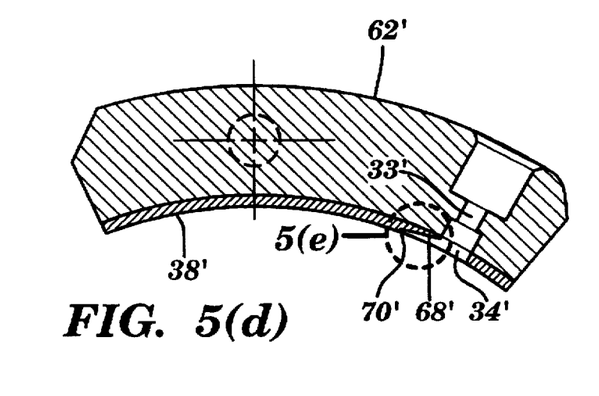
FIG. 5(d) is a cross-sectional view of an alternative embodiment for the tilting bearing pad.
Figure 5E:
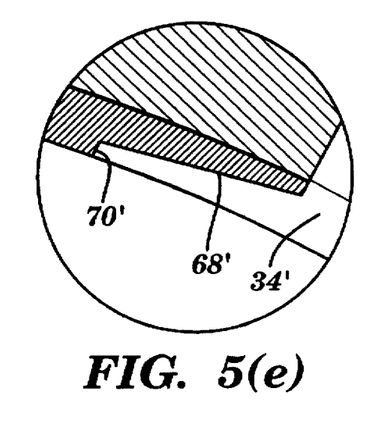
FIG. 5(e) is an enlarged view of the profiled area of the tilting bearing pad shown in FIG. 5(d).

Referring to FIG. 5(a), the feed hole 33 is adjacent to the leading edge 40 and is located substantially in the middle of the opposing side surfaces 64 and 66, although the location for the feed hole 33 can vary as needed. As shown in FIG. 5(a), the end of the axial feed groove 34 adjacent to the inner surface 38 extends along a substantial portion of the axial length of the tilting bearing pad 26 and is substantially parallel with the leading edge 40.

Referring to FIG. 5(a–e), the profiled area 68 extends from one side of the axial feed groove 34 towards the trailing edge 36 of the tilting bearing pad 26 along the inner surface 38. In this particular, embodiment, the end 70 of the profiled area 68 facing the trailing edge 36 is tapered and is known as a tapered groove profiled area, although the end 70' of the profiled area 68' could have other shapes, such as being squared which is shown in FIG. 5(a–e) and is known as a pocket groove profiled area. Like the end of the axial feed groove 34 adjacent to the inner surface 38, the profiled area 68 extends along a substantial part of the axial length of the tilting bearing pad 26 and is substantially parallel with the leading edge 40. The side of axial feed groove 34 facing the leading edge 40 is substantially flush with the rest of that side of the axial feed groove 34 and does not extend towards the leading edge 40.

The operation of the turbine engine 28 with the tilting bearing pads 26 in accordance with the present invention will be described with reference to FIGS. 1, 3, 4(a), and 5(a–c). Rotor 42 is seated in exhaust end and steam end bearing cases 46 and 48 and rotates in the direction of arrow R shown in FIG. 4(a). Fluid is supplied from the fluid supply system 58 to the annulus 51 via the oil supply groove 57 and from the annulus 51 is supplied to each of the feed holes 33 via feed tubes 60. The fluid in the feed holes 33 flows to axial feed grooves 34 and exits feed grooves 34 into the profiled areas 68 in inner surface 38 of the tilting bearing pads 26. The profiled areas 68 provide an area of supplemental hydrodynamic/hydrostatic pressure generation. More specifically, the design of the profiled areas 68 ensures a convergent fluid-shaped wedge to develop which forces the leading edge 40 of the tilting bearing pad 26 to pivot in a radial direction away from the rotor 42, thus increasing the pad attitude angle.

Figure 4B:
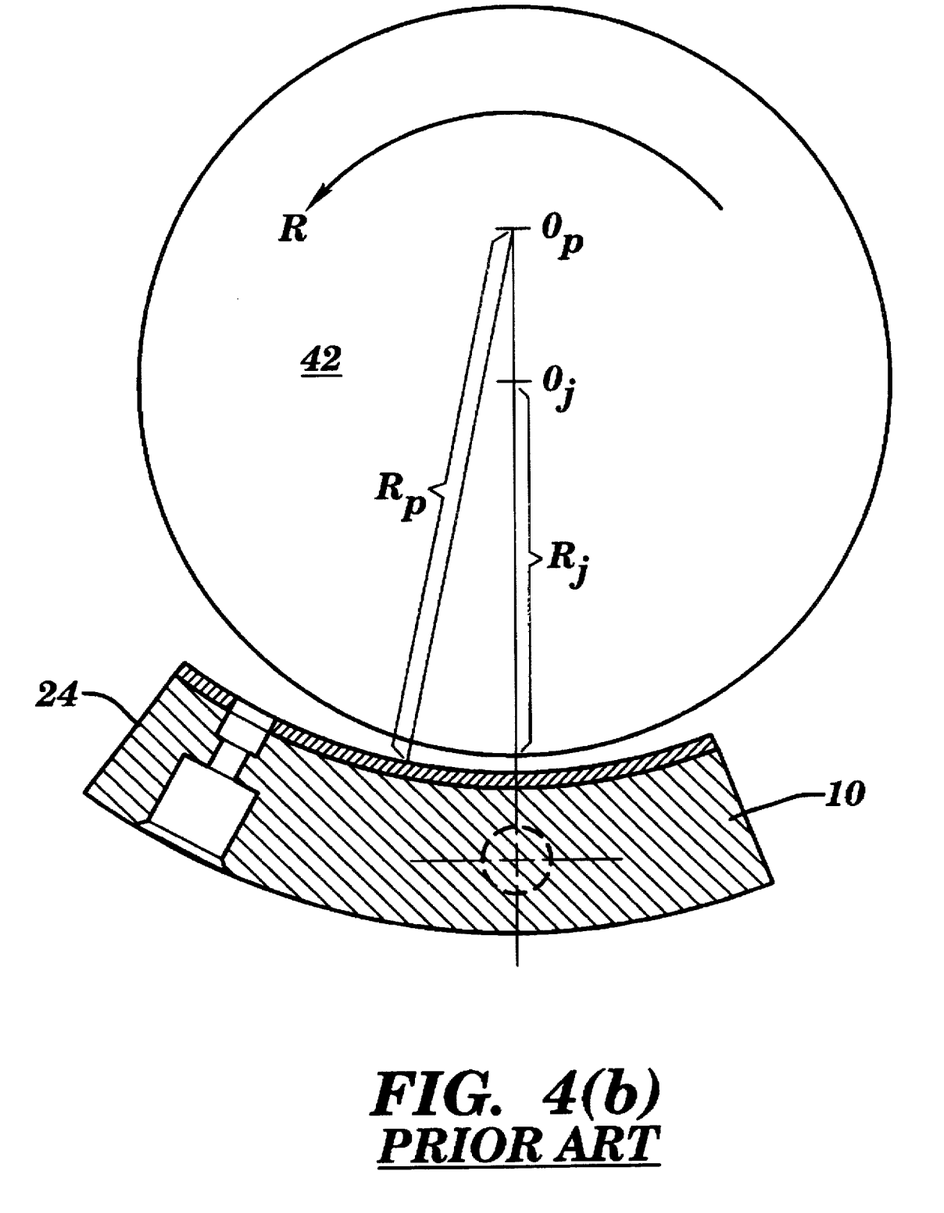
FIG. 4(b) is a cross-sectional view of the prior art tilting bearing pad shown in FIGS. 1(a–b) and a rotor to illustrate attitude angle.
Figure 4C:
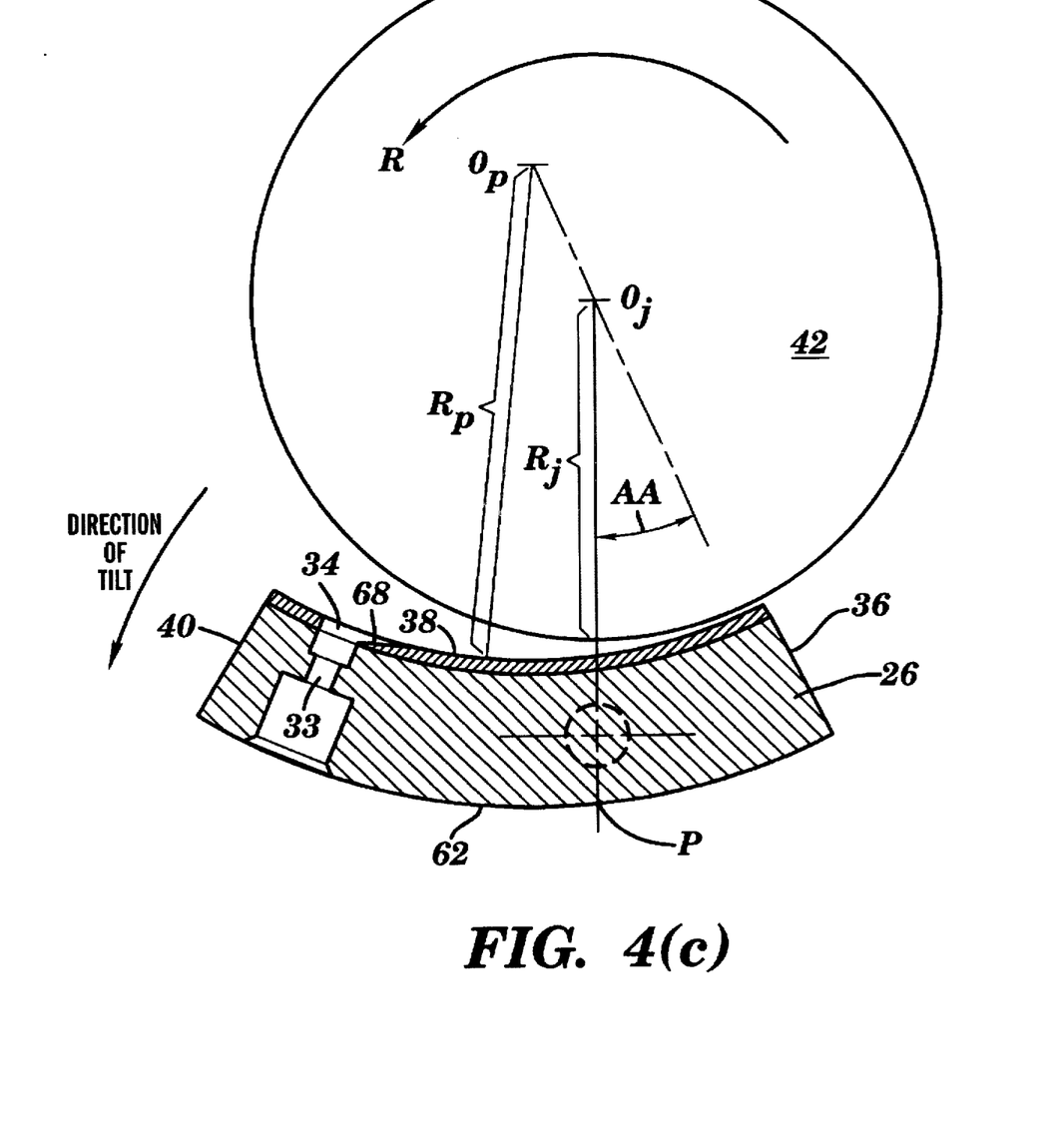
FIG. 4(c) is another cross-sectional view of a tilting bearing pad in accordance with the present invention and a rotor to illustrate attitude angle.

Referring to FIG. 4(c), a cross sectional view of the tilting bearing pad 26 with the rotor 42 is illustrated to show the attitude angle and the development of the convergent fluid-shaped wedge. In FIGS. 4(b–c), $O_J$ identifies the center of the journal or rotor 42, $O_P$ identifies the center of the radius for the pad, $R_J$ is the radius of curvature for the journal or rotor 42, and $R_P$ is the radius of curvature for the pad. As shown in FIG. 4(c), the profiled area 68 causes a convergent fluid-shaped wedge to develop at the leading edge 40 of the tilting bearing pad 26 forcing pad 26 to pivot in a radial direction away from the rotor 42 which increases the pad attitude angle AA. Typically, the attitude angle AA is very small, about 0.10 degrees or less, although the angle can vary as needed. As shown in FIG. 4(b), without profiled area 68, the pad 10 does not develop a convergent fluid shaped wedge over the entire pad 10 and thus has a negligible attitude angle.

The result of this increased radial force on the leading edges 40 of the tilting bearing pads 26 is that it substantially eliminates wakes, vortices, and turbulence in the fluid film. Additionally, because of this force the damping and stability characteristics of the statically loaded pads (the pads in the lower half of the bearing) are optimized. More specifically, when compared with the pad 10 shown in FIGS. 1(a–b) the amplitude of vibration of the rotor 42 as it passes through the critical speed is improved by at least a factor of four and over the entire operating range is improved by at least a factor of two. As a secondary benefit, the statically unloaded pads 26 (the pads in the upper half of the bearing) are less prone to flutter which can fatigue the babbitt material lining the inner surface 38 of the pad 26.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A tilting bearing pad comprising:

a bearing pad with opposing inner and outer surfaces, leading and trailing edges, and a pair of opposing side edges;

an opening extending from the outer surface to the inner surface of the bearing pad; and a profiled area extending towards the trailing edge along the inner surface of the bearing pad from a first side of the opening facing the trailing edge, another side of the opening facing the leading edge remaining substantially flush with the opening, the profiled area being spaced from each of the opposing side edges.

2. The tilting bearing pad as set forth in claim 1 wherein an end of the profiled area facing the trailing edge is tapered.

3. The tilting bearing pad as set forth in claim 1 wherein an end of the profiled area facing the trailing edge is squared.

4. The tiring bearing pad as set forth in claim 1 wherein the opening is positioned adjacent to the leading edge of the bearing pad and comprises a feed hole extending from the outer surface towards the inner surface connected to a feed groove which extends to the inner surface and extends along in a direction substantially parallel with the leading edge.

5. The tilting bearing pad as set forth in claim 4 wherein the feed hole is substantially centered between the opposing side surfaces.

6. A turbine engine with a rotor which rotates about a first axis in a steam turbine case, the turbine engine comprising:

at least two bearing cases;

a housing ring with first and second end plates connected to opposing ends of the housing ring in each bearing case, the rotor extending through the first and second end plates and the housing ring in each of the bearing cases along a first axis;

at least two bearing pads for each housing ring, each of the bearing pads having opposing inner and outer surfaces, leading and trailing edges, and a pair of opposing side edges, each of the bearing pads positioned inside the housing ring and between the housing ring and the rotor, and each of the bearing pads having a pivot point located adjacent to the outer surface of the bearing pad and an inner surface of the housing ring;

an opening extending from the outer surface to the inner surface of each of the bearing pads;

a profiled area extending towards the trailing edge of the bearing pad from the opening along the inner surface, the side of the feed hole facing the leading edge remaining substantially flush with the opening, the profiled area being spaced from each of the opposing side edges; and a fluid supply system connected to each of the openings.

7. The turbine engine as set forth in claim 6 wherein an end of the profiled area facing the trailing edge is tapered.

8. The turbine engine as set forth in claim 6 wherein an end of the profiled area facing the trailing edge is squared.

9. The turbine engine as set forth in claim 6 wherein the opening is positioned adjacent to the leading edge of the bearing pad and comprises a feed hole extending from the outer surface towards the inner surface connected to a feed groove which extends to the inner surface and extends along in a direction substantially parallel with the leading edge.

10. The turbine engine as set forth in claim 9 wherein the opening is substantially centered between the opposing side surfaces.

11. The turbine engine as set forth in claim 6 wherein there are five bearing pads for each bearing.

12. The turbine engine as set forth in claim 6 wherein the fluid supply system is an oil supply system.

* * * * *